(12) United States Patent
Vasseur

(10) Patent No.: US 8,451,744 B2
(45) Date of Patent: May 28, 2013

(54) PARTITIONING DIRECTED ACYCLIC GRAPH (DAG) TOPOLOGIES

(75) Inventor: Jean-Philippe Vasseur, Saint Martin dUriage (FR)

(73) Assignee: Cisco Technology, Inc., San Jose, CA (US)

( * ) Notice: Subject to any disclaimer, the term of this patent is extended or adjusted under 35 U.S.C. 154(b) by 292 days.

(21) Appl. No.: 12/895,991

(22) Filed: Oct. 1, 2010

(65) Prior Publication Data

US 2012/0039190 A1 Feb. 16, 2012

Related U.S. Application Data

(60) Provisional application No. 61/374,105, filed on Aug. 16, 2010.

(51) Int. Cl.
*H04L 12/26* (2006.01)
*H04L 12/28* (2006.01)
*G01R 31/08* (2006.01)
*H04J 3/14* (2006.01)
*G08C 15/00* (2006.01)
*G06F 11/00* (2006.01)

(52) U.S. Cl.
USPC ........... 370/252; 370/235; 370/238; 370/254; 370/256; 370/338; 370/349; 370/392

(58) Field of Classification Search
None
See application file for complete search history.

(56) References Cited

U.S. PATENT DOCUMENTS

| | | | |
|---|---|---|---|
| 5,864,542 A | 1/1999 | Gupta et al. | |
| 6,226,788 B1 | 5/2001 | Schoening et al. | |
| 7,117,273 B1 | 10/2006 | O'Toole et al. | |
| 7,433,696 B2 | 10/2008 | Dietrich et al. | |
| 7,490,014 B1 * | 2/2009 | Koren et al. | 702/94 |
| 7,593,377 B2 * | 9/2009 | Thubert et al. | 370/338 |
| 7,609,672 B2 | 10/2009 | Retana et al. | |
| 7,656,857 B2 | 2/2010 | Thubert et al. | |
| 7,668,119 B2 | 2/2010 | Thubert et al. | |
| 7,693,064 B2 * | 4/2010 | Thubert et al. | 370/235 |
| 7,747,674 B2 * | 6/2010 | Barkai et al. | 709/202 |
| 7,765,283 B2 | 7/2010 | Noy et al. | |
| 7,805,517 B2 | 9/2010 | Shim et al. | |
| 2008/0130500 A1 | 6/2008 | Retana et al. | |
| 2009/0046734 A1 | 2/2009 | Cheriton et al. | |

OTHER PUBLICATIONS

Thubert, P., RPL Objective Function 0, Network Working Group Internet Draft, draft-ietf-roll-of0-03, IETF, Jul. 29, 2010, 10 pages.
Vasseur, Jean-Philippe, Techniques for Managing Directed Acyclic Graphs in a Computer Network, U.S. Appl. No. 61/374,105, filed Aug. 16, 2010, 38 pages.
Vasseur, Jean-Philippe, et al., Routing Metrics Used for Path Calculation in Low Power and Lossy Networks, Network Working Group Internet Draft, draft-ietf-roll-routing-metrics-08, IETF, Jul. 9, 2010, 31 pages.

* cited by examiner

*Primary Examiner* — Andrew Chriss
*Assistant Examiner* — Ajit Reddy
(74) *Attorney, Agent, or Firm* — Cesari and McKenna, LLP

(57) ABSTRACT

In one embodiment, network statistics may be monitored for a first directed acyclic graph (DAG) from a first root node, and based on those network statistics, a trigger may be determined to partition the first DAG. As such, a candidate second root node may be selected for each of one or more DAG partitions, and a tunnel may be established between the first root node and the one or more second root nodes. Each second root node may then establish a new DAG partition with itself as the root (and with the same DAG parameters as the first DAG), wherein nodes of the first DAG remain with the first DAG or attach to the new DAG partition based on one or more metrics associated with each respective root (e.g., reachability, cost, DAG rank, etc.).

24 Claims, 5 Drawing Sheets

PARTITIONING DIRECTED ACYCLIC GRAPH (DAG) TOPOLOGIES

RELATED APPLICATIONS

The present application claims priority to U.S. Provisional Application Ser. No. 61/374,105, filed on Aug. 16, 2010, entitled TECHNIQUES FOR MANAGING DIRECTED ACYCLIC GRAPHS IN A COMPUTER NETWORK, by Jean-Philippe Vasseur, the contents of which is hereby incorporated by reference.

TECHNICAL FIELD

The present disclosure relates generally to computer networks, and, more particularly, to directed acyclic graph (DAG) routing and management, e.g., for Low power and Lossy Networks (LLNs).

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability, etc. One example routing solution to LLN challenges is a protocol called Routing Protocol for LLNs or "RPL," which is a distance vector routing protocol that builds a Destination Oriented Directed Acyclic Graph (DODAG) in addition to a set of features to bound the control traffic, support local (and slow) repair, etc. The RPL architecture provides a flexible method by which each node performs DODAG discovery, construction, and maintenance.

One problem that confronts LLNs is scalability of the networks, since DAGs can be relatively small (e.g., hundreds of nodes) or extremely large (e.g., millions of nodes). Currently, scalability is achieved in RPL by limiting control plane traffic using dynamic timers (known as Trickle-based timers) to only require control plane traffic when needed, along with other mechanisms, such as threshold-based reporting (e.g., metric smoothing). Still, however, even with limited control plane traffic, many operations require action by the entire DAG, such as a complete rebuild of the DAG (global repair), which is an expensive operation for such networks. In addition, some of these actions in certain networks, such as those meant to carry sensitive traffic (e.g., alarms), may require frequent global operations. With large DAGs, complete rebuilds or other such operations are difficult to scale and can become extremely costly in terms of management (memory, processing, battery life, etc.).

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
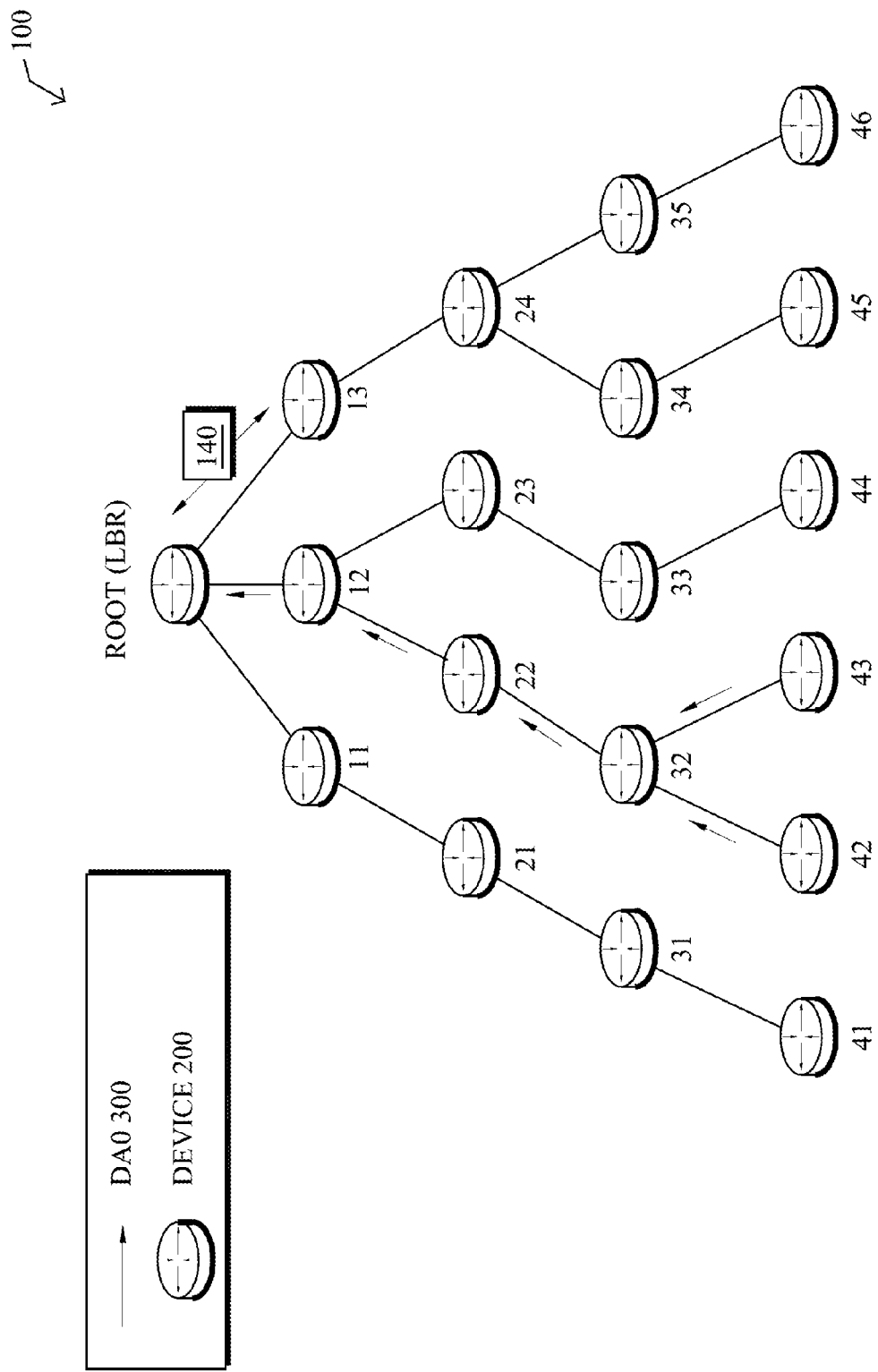
FIG. 1 illustrates an example computer network and a directed acyclic graph (DAG)

According to one or more embodiments of the disclosure, network statistics may be monitored for a first directed acyclic graph (DAG) from a first root node, and based on those network statistics, a trigger may be determined to partition the first DAG. As such, a candidate second root node may be selected for each of one or more DAG partitions, and a tunnel may be established between the first root node and the one or more second root nodes. Each second root node may then establish a new DAG partition with itself as the root (and with the same DAG parameters as the first DAG), wherein nodes of the first DAG remain with the first DAG or attach to the new DAG partition based on one or more metrics associated with each respective root (e.g., reachability, cost, DAG rank, etc.).

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, CPL G3, WPC and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network consisting of spatially distributed autonomous devices such as sensors that cooperatively monitor physical or environmental conditions at different locations, such as, e.g., temperature, pressure, vibration, sound, radiation, motion, pollutants, etc. Other types of smart objects include actuators, e.g., responsible for turning on/off an engine or perform any other actions. Sensor networks are typically wireless networks, though wired connections are also available. That is, in addition to one or more sensors, each sensor device (node) in a sensor network may generally be equipped with a radio transceiver or other communication port, a microcontroller, and an energy source, such as a battery. Generally, size and cost constraints on sensor nodes result in corresponding constraints on resources such as energy, memory, computational speed and bandwidth. Correspondingly, a reactive routing protocol may, though need not, be used in place of a proactive routing protocol for sensor networks.

In certain configurations, the sensors in a sensor network transmit their data to one or more centralized or distributed database management nodes that obtain the data for use with one or more associated applications. Alternatively (or in addition), certain sensor networks provide for mechanisms by which an interested subscriber (e.g., "sink") may specifically request data from devices in the network. In a "push mode," the sensors transmit their data to the sensor sink/subscriber without prompting, e.g., at a regular interval/frequency or in response to external triggers. Conversely, in a "pull mode," the sensor sink may specifically request that the sensors (e.g., specific sensors or all sensors) transmit their current data (or take a measurement, and transmit that result) to the sensor sink. (Those skilled in the art will appreciate the benefits and shortcomings of each mode, and both apply to the techniques described herein.)

FIG. 1 is a schematic block diagram of an example computer network 100 illustratively comprising nodes/devices 200, such as, e.g., routers, sensors, computers, etc., interconnected by various methods of communication (e.g., and labeled as shown, "LBR," "11," "12," . . . "46"). For instance, the links may be wired links or may comprise a wireless communication medium, where certain nodes 200 may be in communication with other nodes 200, e.g., based on distance, signal strength, current operational status, location, etc. Those skilled in the art will understand that any number of nodes, devices, links, etc. may be used in the computer network, and that the view shown herein is for simplicity. Illustratively, certain devices in the network may be more capable than others, such as those devices having larger memories, sustainable non-battery power supplies, etc., versus those devices having minimal memory, battery power, etc. For instance certain devices 200 may have no or limited memory capability. Also, one or more of the devices 200 may be considered "root nodes/devices" (or root capable devices) while one or more of the devices may also be considered "destination nodes/devices."

Data packets 140 (e.g., traffic and/or messages sent between the devices/nodes) may be exchanged among the nodes/devices of the computer network 100 using predefined network communication protocols such as the Transmission Control Protocol/Internet Protocol (TCP/IP), User Datagram Protocol (UDP), Multi-Protocol Label Switching (MPLS), various proprietary protocols, etc. In this context, a protocol consists of a set of rules defining how the nodes interact with each other. In addition, packets within the network 100 may be transmitted in a different manner depending upon device capabilities, such as source routed packets.

Figure 2:
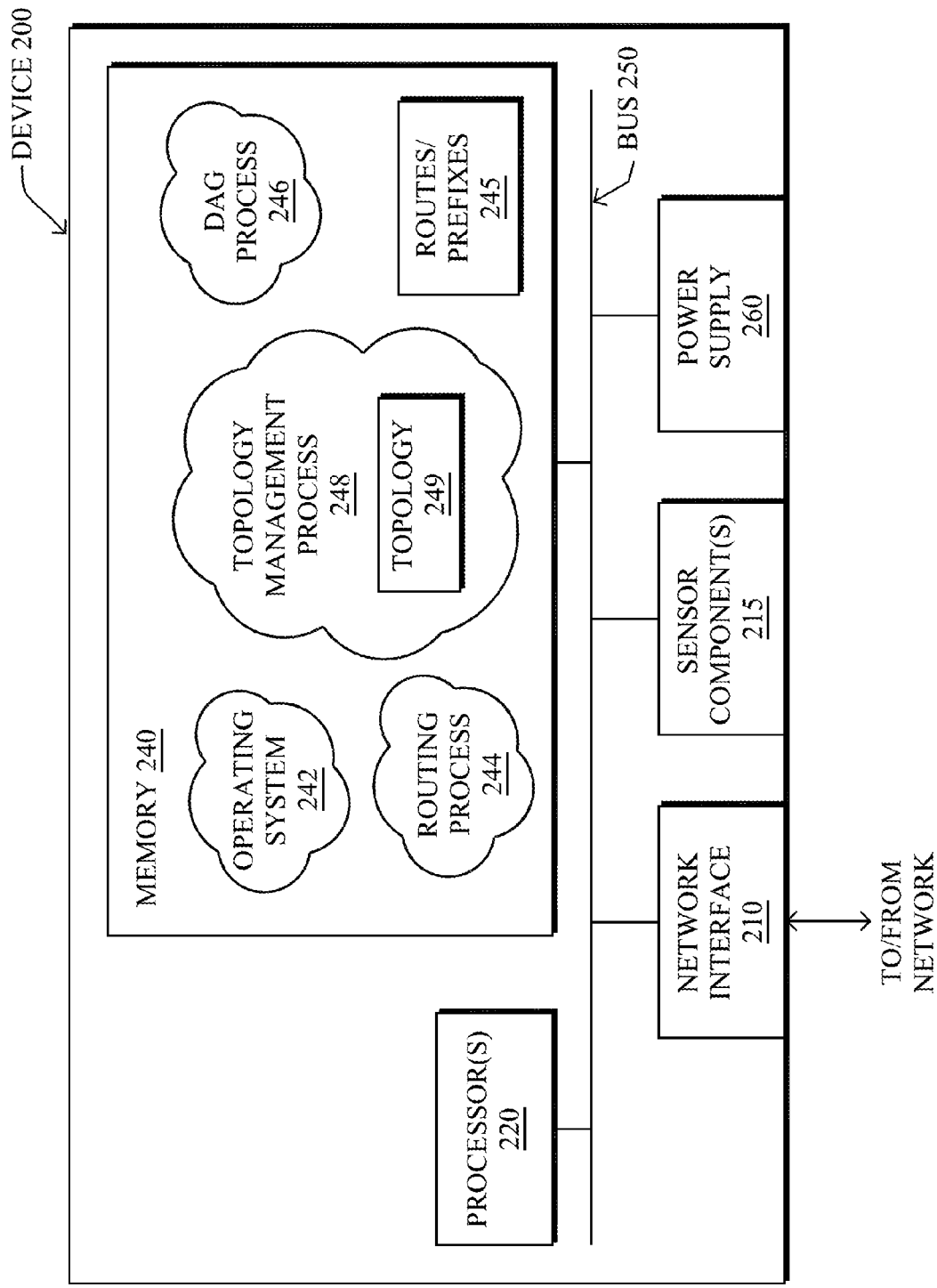
FIG. 2 illustrates an example network device/node.

FIG. 2 is a schematic block diagram of an example node/device 200 that may be used with one or more embodiments described herein, e.g., as a root node or sensor. The device may comprise one or more network interfaces 210, one or more sensor components 215 (e.g., sensors, actuators, etc.), a processor 220 (e.g., an 8-64 bit microcontroller), and a memory 240 interconnected by a system bus 250, as well as a power supply 260 (e.g., battery, plug-in, etc.). The network interface(s) 210 contain the mechanical, electrical, and signaling circuitry for communicating data over physical and/or wireless links coupled to the network 100. The network interfaces may be configured to transmit and/or receive data using a variety of different communication protocols, including, inter alia, TCP/IP, UDP, wireless protocols (e.g., IEEE Std. 802.15.4, WiFi, Bluetooth®), Ethernet, powerline communication (PLC) protocols, etc.

The memory 240 comprises a plurality of storage locations that are addressable by the processor(s) 220 and the network interfaces 210 for storing software programs and data structures associated with the embodiments described herein. As noted above, certain devices may have limited memory or no memory (e.g., no memory for storage other than for programs/processes operating on the device). The processors 220 may comprise necessary elements or logic adapted to execute the software programs and manipulate the data structures, such as routes or prefixes 245 (notably on capable devices only). An operating system 242, portions of which are typically resident in memory 240 and executed by the processor(s), functionally organizes the device by, inter alia, invoking operations in support of software processes and/or services executing on the device. These software processes and/or services may comprise routing process/services 244, which may include an illustrative directed acyclic graph (DAG) process 246. Also, for root devices (or other management devices), a topology management process 248 and associated stored topologies 249 may also be present in memory 240, for use as described herein. It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process).

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table 245 containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example protocol specified in an Internet Engineering Task Force (IETF) Internet Draft, entitled "RPL: IPv6 Routing Protocol for Low Power and Lossy Networks"<draft-ietf-roll-rpl-11> by Winter, at al. (Jul. 28, 2010 version), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc.

A DAG is a directed graph having the property that all edges are oriented in such a way that no cycles (loops) exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG has one parent or, as used herein, one preferred parent.

DAGs may generally be built based on an Objective Function (OF), which may define a set of routing metrics, optimization objectives, constraints, and related functions are in use in a DAG. That is, a role of the Objective Function is to specify one or more metrics to optimize the DAG against, as well as how these are used to compute a best (e.g., shortest) path. Also, the OF may include an optional set of constraints to compute a constrained path, such as where if a link or a node does not satisfy a required constraint, it is "pruned" from the candidate list when computing the best path. (Alternatively, the constraints and metrics may be separated from the OF.) Additionally, OFs may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, policies, etc., of an OF are considered "DAG parameters."

Illustratively, example metrics used to select paths (e.g., preferred parents) may comprise cost, delay, latency, bandwidth, estimated transmission count (ETX), etc., while example constraints that may be placed on the route selection may comprise various reliability thresholds, restrictions on battery operation, multipath diversity, load balancing requirements, bandwidth requirements, transmission types (e.g., wired, wireless, etc.), and also a number of selected parents (e.g., single parent trees or multi-parent DAGs). Notably, an example for how routing metrics may be obtained may be found in an IETF Internet Draft, entitled "Routing Metrics used for Path Calculation in Low Power and Lossy Networks"<draft-ietf-roll-routing-metrics-08> by Vasseur, et al. (Jul. 8, 2010 version). Further, an example OF (e.g., a default OF) may be found in an IETF Internet Draft, entitled "RPL Objective Function 0"<draft-ietf-roll-of0-03> by Thubert (Jul. 29, 2010 version).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going against the orientation of the edges within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state.

Figure 3:
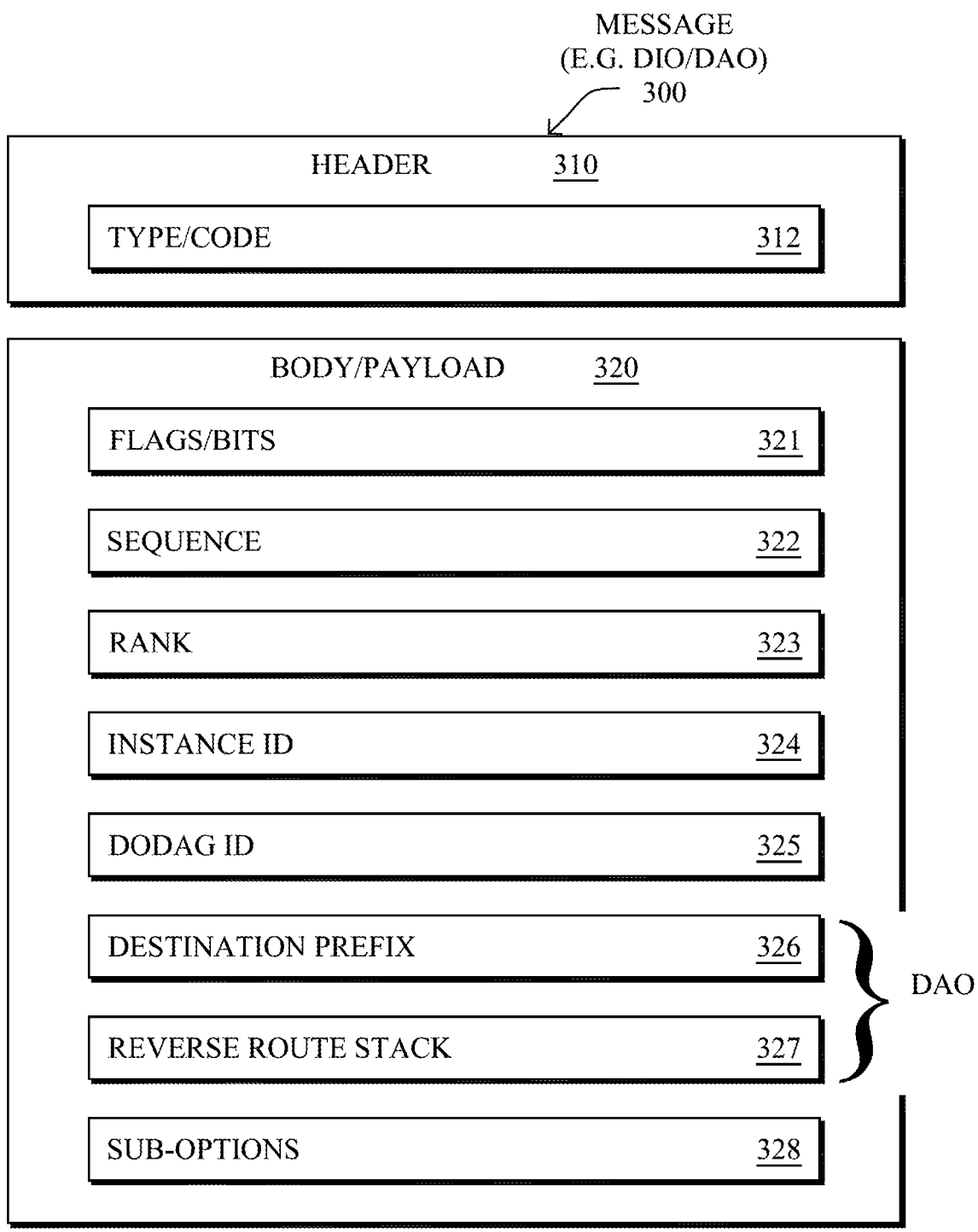
FIG. 3 illustrates an example message.

FIG. 3 illustrates an example simplified control message format 300 that may be used for discovery and route dissemination when building a DAG, e.g., as a DIO or DAO. Message 300 illustrative comprises a header 310 within one or more fields 312 that identify the type of message (e.g., a RPL control message), and a specific code indicating the specific type of message, e.g., a DIO or a DAO (or a DAG Information Solicitation). Within the body/payload 320 of the message may be a plurality of fields used to relay the pertinent information. In particular, the fields may comprise various flags/bits 321, a sequence number 322, a rank value 323, an instance ID 324, and a DAG ID 325, and other fields, each as may be appreciated in more detail by those skilled in the art. Further, for DAO messages, additional fields for destination prefixes 326 and a reverse route stack 327 may also be included. For either DIOs or DAOs, one or more additional sub-option fields 328 may be used to supply additional or custom information within the message 300. For instance, an objective code point (OCP) sub-option field may be used within a DIO to carry codes specifying a particular objective function (OF) to be used for building the associated DAG.

DAG Topology Partitioning

As noted above, a problem that confronts LLNs is scalability of the networks, since DAGs can be relatively small (e.g., hundreds of nodes) or extremely large (e.g., millions of nodes). Currently, scalability is achieved in RPL by limiting control plane traffic using dynamic timers (known as Trickle-based timers) to only require control plane traffic when needed, along with other mechanisms, such as threshold-based reporting (e.g., metric smoothing). Still, however, even with limited control plane traffic, many operations require action by the entire DAG, such as a complete rebuild of the DAG (global repair), which is an expensive operation for such networks. In addition, some of these actions in certain networks, such as those meant to carry sensitive traffic (e.g., alarms), may require frequent global operations. With large DAGs, complete rebuilds or other such operations are difficult to scale and can become extremely costly in terms of management (memory, processing, battery life, etc.).

In other words, RPL supports a number of metrics and/or constraints and supports multi-topology routing according to a pre-defined objective function (e.g. optimize delay while avoiding battery operated nodes, etc.). One of the major concerns in LLNs such as smart meters networks is scalability, which may be achieved by RPL by limiting the control plane traffic using dynamic timers (known as Trickle-based timers) to only require control plane traffic when needed along with other mechanisms. RPL supports both local and global repairs, relies on data-plane validation techniques to detect and break potential loops (which allows for limiting the control plane traffic), makes use of link metrics smoothing factors, etc. Still such networks can comprise several hundreds of thousands of nodes, if not millions (based on currently deployed networks).

For example, as links flap, the DAG is being repaired: such repair could be local to limit the control plane traffic but then the downside of such as local repair is that this quickly leads to sub-optimal DAGs. The only solution then consists of performing a global repair (and rebuild the DAG entirely), which is an expensive operation for such networks. In order to preserve scalability, threshold based mechanisms may be used to dictate when to report an updated routing metric. But it is sometimes necessary to quickly update routing metrics so as to get the most optimal path for DAG carrying sensitive traffic (e.g. alarms in Smart Grid).

According to one or more additional embodiments of the disclosure, therefore, auto-partitioning mechanisms are described to improve the scalability of RPL enabled networks (e.g., smart grid, smart cities). In particular, though the above-mentioned mechanisms help in terms of scalability, to reach a very large scale the techniques herein partition the routing domain and effectively build multiple DAGs with minimal manual configuration. Unfortunately, such network design is extremely challenging, and requires a deep understanding of the traffic matrix and extensive simulation, which makes the deployment of such network potentially quite challenging.

To alleviate the challenges associated with partitioning a DAG, according to these embodiments, network statistics may be monitored for a first DAG from a first root node, and based on those network statistics, a trigger may be determined to partition the first DAG. As such, a candidate second root node may be selected for each of one or more DAG partitions, and a tunnel may be established (if needed) between the first root node and the one or more second root nodes. Each second root node may then establish a new DAG partition with itself as the root (and with the same DAG parameters as the first DAG), wherein nodes of the first DAG remain with the first DAG or attach to the new DAG partition based on one or more metrics associated with each respective root (e.g., reachability, cost, DAG rank, etc.).

Illustratively, the techniques described herein may be performed by hardware, software, and/or firmware, such as in accordance with a topology management process 248 for root device functionality, which may contain computer executable instructions executed by the processor 220 to perform functions relating to the novel techniques described herein, e.g., in conjunction with routing process 244 and DAG process 246. Further, non-root nodes within the DAG may perform the techniques herein in accordance with DAG process, e.g., configured specifically to perform the functions herein or in a default manner (e.g., selecting root nodes and corresponding DAGs to join).

Operationally, it may first be determined that a topology split would be beneficial in the network to improve its overall operation and scalability. By monitoring network statistics, a number of triggers can be used to determine whether a network split is required: the amount of control plane (routing traffic), especially when compared to the data traffic; the number of local repairs that took place in the network; the statistics on link loads, fan-out ratio, etc.

A DAG partition (network split) consists of splitting routing domains, thus building a set of interconnected DAGs, as opposed to a single DAG. Having multiple DAGs has the effect of allowing for more optimal paths, but it will also be possible to increase the metric granularity, the frequency at which the DAG can be rebuilt while decreasing the proportion of routing traffic control/data traffic ratio, etc.

Once the need for network split has been identified, a DAG root election process starts. At first a single DAG is built (thus with one DAG root, e.g., "LBR") and a set of nodes capable of acting as DAG roots (referred to as DAG-root-ready nodes) is configured. When the network bootstraps itself, a single DAG is built and the network may start the network statistic process described above. When pre-defined thresholds are crossed (presence of hot spots, too high control plane traffic/data traffic, etc.), the DAG root starts searching for DAG-root-ready nodes. This may be performed by sending a Multicast query that travels along the DAG. Once the set S of DAG-root-ready nodes is identified, the DAG root starts the following process:

For i=1 to S:
Send the DAG configuration parameters to DAG-root-ready(i), since each resulting DAG should (e.g., must) use the same DAG parameters than the original DAG (same RPL timers, objective function, set of metrics used by the DAG, etc.);
Wait for the expiration of a fixed timer (to avoid traffic churn); and
Establish a tunnel between the requesting DAG root and DAG-root-ready(i) (e.g., an IP tunnel, direct connectivity using higher power wireless direct link, etc.).

Figure 4:
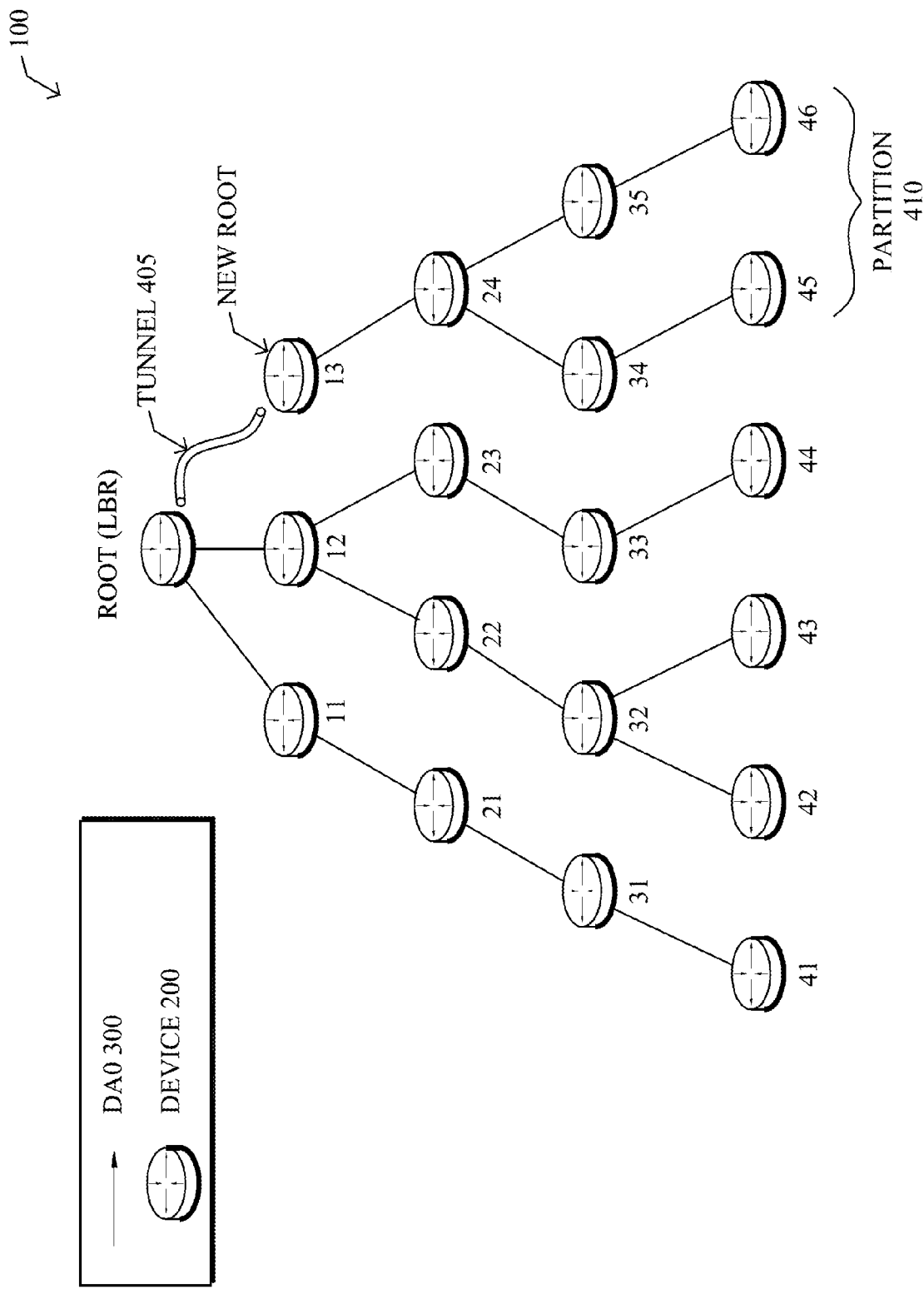
FIG. 4 illustrates an example DAG partition.

Upon receiving such a request, each DAG-root-ready node starts to act as a DAG root. As a result some nodes in the network will start to attach to this new DAG, as illustrated in FIG. 4, showing a tunnel 405, a partition 410 under new root 13.

Various mechanisms can be used to attract some nodes to the new DAG, in order to increase the number of nodes that join the new DAG given a substantially equal option to remain in its current DAG. For instance, a new object may be propagated within the new DAG messages (300) that defines the probability for each node to attach to the newly formed DAG to as to distribute the nodes across DAGs. Also, dynamic updates to the probabilistic value may be passed to the new DAG root, should the number of nodes that have "jumped to" the new DAG be insufficient, thus increasing the "attractiveness" of the new root, accordingly.

Depending on the network statistic process outcome (the above mode of operation should be incremental and smooth) an implementation may choose to form one additional DAG up to S (the number of capable root nodes), incrementally (e.g., as more are needed), or simultaneously (e.g., if it is determined that more are needed at the same time). Note also that provisions may be made in the reverse to converge partitioned DAGs, such as based on network statistics indicating that there is no value added by having partitioned DAGs.

Figure 5:
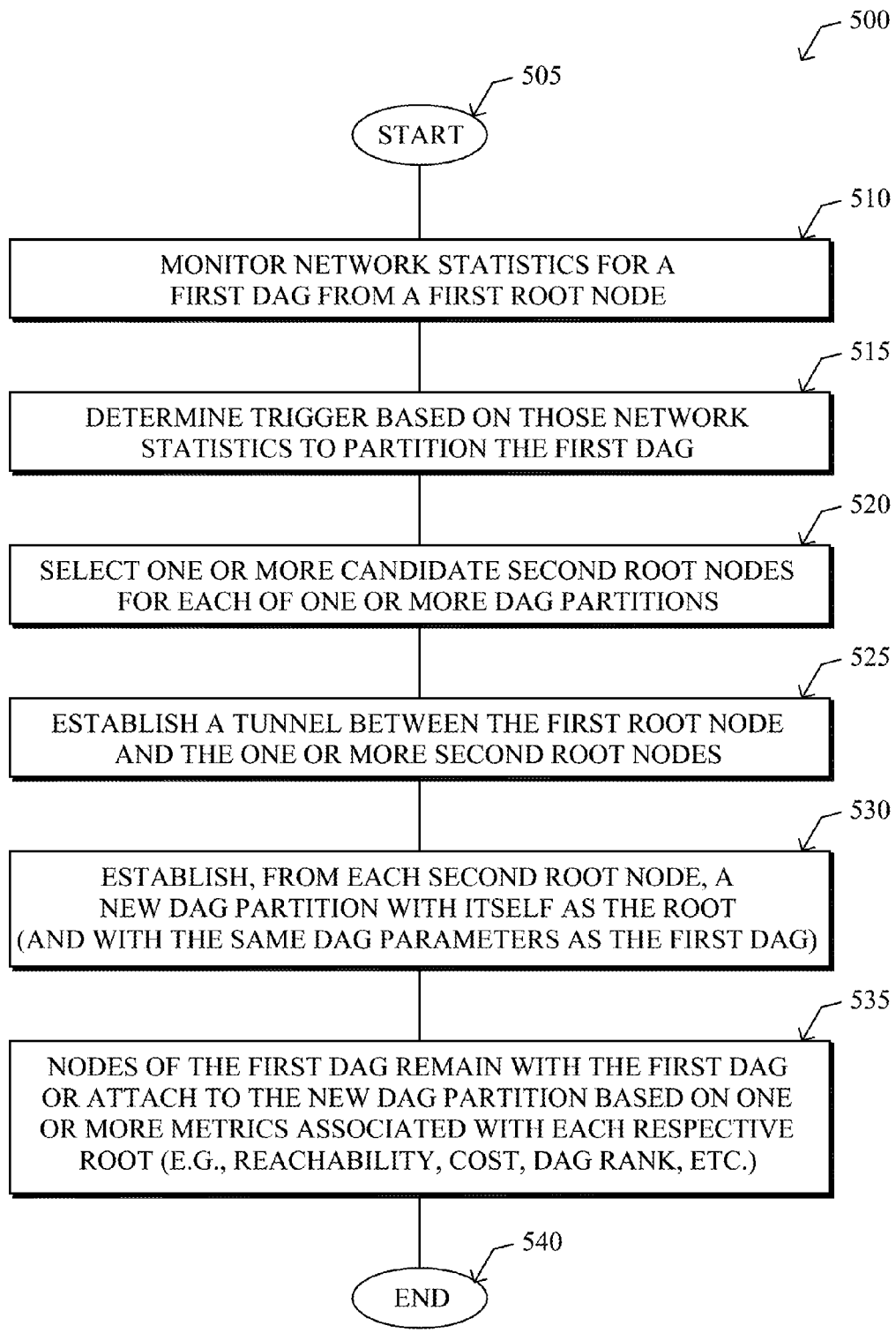
FIG. 5 illustrates an example simplified procedure for dynamically partitioning DAGs.

FIG. 5 illustrates an example simplified procedure for dynamically partitioning DAGs in accordance with one or more embodiments described herein. The procedure 500 starts at step 505, and continues to step 510, where network statistics may be monitored for a first DAG from a first root node. Based on those network statistics, a trigger may be determined in step 515 to partition the first DAG, and if so, then in step 520 a candidate second root node may be selected for each of one or more DAG partitions. Also, in step 525, a tunnel may be established between the first root node and the one or more second root nodes. Once provided with the same DAG parameters as the first DAG, in step 530 each second root node may establish a corresponding new DAG partition with itself as the root. Nodes of the first DAG may then either remain with the first DAG or attach to the new DAG partition in step 535 based on one or more metrics associated with each respective root (e.g., reachability, cost, DAG rank, etc.), and the procedure 500 ends in step 540.

The novel techniques described herein allow a network experiencing scalability issues to automatically split the routing domain (a current DAG) by forming a set of DAGs without manual intervention. In particular, by gathering various key network statistics, a DAG root may decide when to perform a network split, and may also determine a number of required additional DAGs. That is, the techniques may start with a single DAG, and may dynamically form new DAGs (e.g., interconnected by tunnels) based on the gather network statistics, without any manual intervention. Accordingly, the techniques herein may dramatically increase the scalability of large scale LLNs (e.g., IP smart object networks) using RPL as their routing protocol. Also, the dynamic partitioning techniques provide functionality as described above that would be difficult, if not impossible, to perform manually, While there have been shown and described illustrative embodiments that manage DAGs in a computer network, it is to be understood that various other adaptations and modifications may be made within the spirit and scope of the embodiments herein. For example, the embodiments have been shown and described herein with relation to LLNs, and more particular, to the RPL protocol. However, the embodiments in their broader sense are not so limited, and may, in fact, be used with other types of networks and/or protocols utilizing DAG routing (e.g., distance vector protocols).

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
monitoring network statistics for a first directed acyclic graph (DAG) from a first root node;
determining a trigger to partition the first DAG based on the network statistics;
in response to the trigger, selecting a candidate second root node for each of one or more DAG partitions; and
requesting, by the first root node, that each selected second root node establish a new DAG partition with the respective second root node itself as the root of their new DAG, wherein nodes of the first DAG one of either remain with the first DAG or attach to the new DAG partition based on one or more metrics associated with each respective root.

2. The method as in claim 1, further comprising:
establishing a tunnel between the first root node and the one or more second root nodes.

3. The method as in claim 1, further comprising:
sending DAG configuration parameters of the first DAG to the one or more second root nodes such that the one or more new DAGs are established with the same DAG configuration parameters as the first DAG.

4. The method as in claim 1, wherein determining the trigger comprises:
determining the triggers based on one of: an amount of control plane traffic; an amount of control plane traffic when compared to data traffic; a number of local repairs that took place in the network; statistics on link loads within the DAG; and a fan-out ratio of the DAG.

5. The method as in claim 1, wherein selecting a candidate second root node further comprises:
determining a set of candidate root nodes from a set of nodes capable of acting as DAG roots based on one of either a configured list of nodes capable of acting as DAG roots or by searching for the set of nodes capable of acting as DAG roots within the network.

6. The method as in claim 1, further comprising:
incrementally requesting one or more additional new DAG partitions up to a number of candidate second root nodes in the network.

7. The method as in claim 1, further comprising:
converging one or more new DAG partitions.

8. An apparatus, comprising:
one or more network interfaces;
a processor coupled to the network interfaces and adapted to execute one or more processes; and
a memory configured to store a process executable by the processor, the process when executed operable to:
  operate as a first root node of a first directed acyclic graph (DAG);
  monitor network statistics for the first DAG;
  determine a trigger to partition the first DAG based on the network statistics;
  select a candidate second root node for each of one or more DAG partitions in response to the trigger; and
  request that each selected second root node establish a new DAG partition with the respective second root node itself as the root of their new DAG, wherein nodes of the first DAG one of either remain with the first DAG or attach to the new DAG partition based on one or more metrics associated with each respective root.

9. The apparatus as in claim 8, wherein the process when executed is further operable to:
establish a tunnel between the first root node and the one or more second root nodes.

10. The apparatus as in claim 8, wherein the process when executed is further operable to:
determine the triggers based on one of: an amount of control plane traffic; an amount of control plane traffic when compared to data traffic; a number of local repairs that took place in the network; statistics on link loads within the DAG; and a fan-out ratio of the DAG.

11. The apparatus as in claim 8, wherein the process when executed is further operable to:
determine a set of candidate root nodes from a set of nodes capable of acting as DAG roots based on one of either a configured list of nodes capable of acting as DAG roots or by searching for the set of nodes capable of acting as DAG roots within the network.

12. The apparatus as in claim 8, wherein the process when executed is further operable to:
incrementally request one or more additional new DAG partitions up to a number of candidate second root nodes in the network.

13. The apparatus as in claim 8, wherein the process when executed is further operable to:
request convergence of one or more new DAG partitions.

14. A method, comprising:
receiving, at a candidate second root node, a request from a first root node of a first directed acyclic graph (DAG) to establish a second DAG partition;
determining DAG configuration parameters of the first DAG;
establishing, by the candidate root node, a second DAG partition with itself as the root of the second DAG, the second DAG partition established with the DAG configuration parameters of the first DAG; and
maintaining the second DAG such that nodes of the first DAG one of either remain with the first DAG or attach to the second DAG partition based on one or more metrics associated with the first root node and the second root node.

15. The method as in claim 14, further comprising:
establishing a tunnel between the first root node and the second root node.

16. The method as in claim 14, wherein the one or more metrics associated with the first root node and the second root node comprise at least one of reachability, cost, and DAG rank.

17. The method as in claim 14, wherein the second root node was a node within the first DAG prior to receiving the request.

18. The method as in claim 14, further comprising:
utilizing one or more mechanisms to attract nodes to the second DAG in order to increase a number of nodes that attach to the second DAG given a substantially equal option to remain in the first DAG.

19. The method as in claim 14, further comprising:
monitoring network statistics for the second DAG;
determining a trigger to partition the second DAG based on the network statistics;
in response to the trigger, selecting a candidate third root node for each of one or more DAG partitions; and
requesting, by the second root node, that each selected third root node establish a new DAG partition with the respective third root node itself as the root of their new DAG, wherein nodes of the second DAG one of either remain with the second DAG or attach to the new DAG partition based on one or more metrics associated with each respective root.

20. An apparatus, comprising:
one or more network interfaces;
a processor coupled to the network interfaces and adapted to execute one or more processes; and
a memory configured to store a process executable by the processor, the process when executed operable to:
  receive a request from a first root node of a first directed acyclic graph (DAG) to establish a second DAG partition;
  determine DAG configuration parameters of the first DAG;
  establish a second DAG partition with the apparatus itself as the root of the second DAG, the second DAG partition established with the DAG configuration parameters of the first DAG; and
  maintain the second DAG such that nodes of the first DAG one of either remain with the first DAG or attach to the second DAG partition based on one or more metrics associated with the first root node and the apparatus.

21. The apparatus as in claim 20, wherein the process when executed is further operable to:
establish a tunnel between the first root node and the apparatus for the second DAG partition.

22. The apparatus as in claim 20, wherein the process when executed is further operable to:
operate as a node within the first DAG prior to receiving the request.

23. The apparatus as in claim 20, wherein the process when executed is further operable to:
utilize one or more mechanisms to attract nodes to the second DAG in order to increase a number of nodes that attach to the second DAG given a substantially equal option to remain in the first DAG.

24. The apparatus as in claim 21, wherein the process when executed is further operable to:
monitor network statistics for the second DAG;
determine a trigger to partition the second DAG based on the network statistics;

select a candidate third root node for each of one or more DAG partitions in response to the trigger; and request that each selected third root node establish a new DAG partition with the respective third root node itself as the root of their new DAG, wherein nodes of the second DAG one of either remain with the second DAG or attach to the new DAG partition based on one or more metrics associated with each respective root.

\* \* \* \* \*

UNITED STATES PATENT AND TRADEMARK OFFICE
CERTIFICATE OF CORRECTION

PATENT NO. : 8,451,744 B2
APPLICATION NO. : 12/895991
DATED : May 28, 2013
INVENTOR(S) : Jean-Philippe Vasseur It is certified that error appears in the above-identified patent and that said Letters Patent is hereby corrected as shown below:

In the Claims

In col. 11, line 55-56 should read:
a first root node of a first directed acyclic graph (DAG) indicating the first root node has selected the candidate second root node as a second root node and that the second root node is requested to establish a new second DAG partition;

In col. 11, line 59 should read:
establishing, by the ~~candidate~~ second root node, a new second DAG In col. 11, line 60-61 should read:
partition with the second root node itself as the root of the new second DAG partition, the new second DAG partition established with the DAG con- In col. 11, line 63 should read:
maintaining the new second DAG partition such that nodes of the first In col. 11, line 65 should read:
the new second DAG partition based on one or more metrics In col. 12, line 13 should read:
new second DAG partition in order to increase a number of nodes that In col. 12, line 14 should read:
attach to the new second DAG partition given a substantially equal In col. 12, line 17 should read:
monitoring network statistics for the new second DAG partition;

Signed and Sealed this
Thirtieth Day of July, 2013

Teresa Stanek Rea
*Acting Director of the United States Patent and Trademark Office*

CERTIFICATE OF CORRECTION (continued)
U.S. Pat. No. 8,451,744 B2

In the Claims

In col. 12, line 18 should read:
determining a trigger to partition the <u>new</u> second DAG <u>partition</u> based on In col. 12, line 23 should read:
third root node establish a<u>n additional</u> new DAG partition with the In col. 12, line 25 should read:
DAG, wherein nodes of the <u>new</u> second DAG <u>partition</u> one of either In col. 12, line 25 should read:
remain with the <u>new</u> second DAG <u>partition</u> or attach to the <u>additional</u> new DAG In col. 12, line 36-37 should read:
acyclic graph (DAG) <u>indicating the first node has selected the apparatus as a second root node and that the second root node is requested</u> to establish a <u>new</u> second DAG partition;

In col. 12, line 40 should read:
establish a <u>new</u> second DAG partition with the apparatus In col. 12, line 41 should read:
itself as the root of the <u>new</u> second DAG <u>partition</u>, the <u>new</u> second DAG In col. 12, line 44 should read:
maintain the <u>new</u> second DAG <u>partition</u> such that nodes of the first In col. 12, line 46 should read:
to the <u>new</u> second DAG partition based on one or more In col. 12, line 51-52 should read:
apparatus for the <u>new</u> second DAG partition.

In col. 12, line 60 should read:
<u>new</u> second DAG <u>partition</u> in order to increase a number of nodes that In col. 12, line 61 should read:
attach to the <u>new</u> second DAG <u>partition</u> given a substantially equal In col. 12, line 65 should read:
monitor network statistics for the <u>new</u> second DAG <u>partition</u>;

In col. 12, line 66 should read:
determine a trigger to partition the <u>new</u> second DAG based on

CERTIFICATE OF CORRECTION (continued)
U.S. Pat. No. 8,451,744 B2

In the Claims

In col. 13, line 3 should read:
request that each selected third root node establish a<u>n additional</u> new In col. 13, line 6 should read:
<u>new </u>second DAG <u>partition </u>one of either remain with the <u>new </u>second DAG <u>partition</u>

In col. 13, line 7 should read:
or attach to the <u>additional </u>new DAG partition based on one or more